United States Patent
Cor et al.

(10) Patent No.: US 11,377,393 B2
(45) Date of Patent: Jul. 5, 2022

(54) METHOD AND COMPOSITION FOR IMPROVING PLANT GROWTH

(71) Applicant: DANSTAR FERMENT AG, Zug (CH)

(72) Inventors: Olivier Cor, Saint Jean de Boiseau (FR); Jean-Marc Sanchez, Daux (FR); Bertrand Delaunois, Toulouse (FR)

(73) Assignee: DANSTAR FERMENT AG, Zug (CH)

( * ) Notice: Subject to any disclaimer, the term of this patent is extended or adjusted under 35 U.S.C. 154(b) by 10 days.

(21) Appl. No.: 16/471,520

(22) PCT Filed: Dec. 18, 2017

(86) PCT No.: PCT/EP2017/083314
§ 371 (c)(1),
(2) Date: Jun. 19, 2019

(87) PCT Pub. No.: WO2018/114805
PCT Pub. Date: Jun. 28, 2018

(65) Prior Publication Data
US 2019/0322599 A1    Oct. 24, 2019

(30) Foreign Application Priority Data
Dec. 19, 2016 (EP) ..................... 16204921

(51) Int. Cl.
| C05C 1/00 | (2006.01) |
| C05C 3/00 | (2006.01) |
| C05C 5/04 | (2006.01) |
| C05C 9/00 | (2006.01) |
| C05F 11/08 | (2006.01) |
| C05G 3/60 | (2020.01) |

(52) U.S. Cl.
CPC ............ C05C 1/00 (2013.01); C05C 3/00 (2013.01); C05C 5/04 (2013.01); C05C 9/00 (2013.01); C05F 11/08 (2013.01); C05G 3/60 (2020.02)

(58) Field of Classification Search
CPC .... C05C 1/00; C05C 3/60; C05C 3/00; C05C 5/04; C05C 9/00; C05C 5/00; C05C 11/00; C05F 11/08; C05G 1/00; C05G 3/60; C12N 1/16; A01C 1/06
See application file for complete search history.

(56) References Cited

U.S. PATENT DOCUMENTS

| 9,193,635 | B2 | 11/2015 | Kitagawa et al. |
| 2009/0133456 | A1 | 5/2009 | Zapata et al. |
| 2011/0319264 | A1* | 12/2011 | Kitagawa ............ C09K 17/16 504/117 |

FOREIGN PATENT DOCUMENTS

| CL | 2015003658 A1 | 11/2016 |
| CN | 102405292 A | 4/2012 |
| CN | 104478575 A | 4/2015 |
| EP | 2407546 A1 | 1/2012 |
| FR | 2873688 A1 | 2/2006 |
| FR | 2904310 A1 | 2/2008 |
| JP | 60-226478 A | 11/1985 |
| JP | 61-83696 A | 4/1986 |
| JP | 63-45211 A | 2/1988 |
| JP | 2003-180165 A | 7/2003 |
| TW | 200633638 A | 10/2006 |
| WO | 2006/059683 A1 | 6/2006 |
| WO | 2008015329 A1 | 2/2008 |
| WO | 2008015334 A2 | 2/2008 |
| WO | 2008017751 A1 | 2/2008 |
| WO | 2010/104197 A1 | 9/2010 |
| WO | 2012004219 A1 | 1/2012 |

OTHER PUBLICATIONS

Healthy Grow. "HGHx 10-3-2 infused with Holganix" Product Sheet, <http://healthygrowpro.com/products/hg_10-3-2-hx/> Apr. 5, 2016 (Year: 2016).*
Red Star Yeast. "Brewer's Yeast" <https://redstaryeast.com/science-yeast/types-of-yeast/brewers-yeast/> Feb. 2, 2015 (Year: 2015).*
International search report (ISR), dated Feb. 20, 2018, from corresponding international application No. PCT/EP2017/083314.
Written Opinion of the International Searching Authority (WO-ISA), dated Feb. 20, 2018, from corresponding international application No. PCT/EP2017/083314.
Expert Report issued in Chilean Patent Application No. 201901677 dated Jan. 15, 2021 with English machine translation provided.
Search Report issued in Chilean Patent Application No. 201901677 dated Jan. 15, 2021 with English machine translation provided.
Office Action for RU Patent Application No. 2019122307 dated Mar. 31, 2021 with English translation provided.
Search Report for RU Patent Application No. 2019122307 dated Mar. 25, 2021 with English translation provided.
Summary of the Notice for JP Patent Application No. 2019-533053 dated Apr. 7, 2021 with English translation provided.
"Guidelines for Use of Fertilizers, Ameliorants, and Other Agrochemicals in Cultivation of Rice", Krasnodar, 2016 with English Machine translation provided.
Office Action issued in Chinese Patent Application No. 201780078298.X dated May 31, 2021, 11 pages.
Preliminary Office Action issued in Brazilian Patent Application No. BR112019012549-3 dated Aug. 10, 2021, 2 pages.

* cited by examiner

*Primary Examiner* — Jennifer A Smith
(74) *Attorney, Agent, or Firm* — Nixon & Vanderhye

(57) ABSTRACT

Disclosed is a method and a composition for improving plant growth including applying to a plant, roots of a plant, soil or substrate, or seeds of plants inactive yeast and/or yeast derivatives and at least one nitrogen source.

20 Claims, No Drawings

METHOD AND COMPOSITION FOR IMPROVING PLANT GROWTH

FIELD OF THE INVENTION

The present application relates to a method and composition for improving plant growth responses and increasing plant development by the application of a composition comprising inactive yeast and/or yeast derivatives in combination with a nitrogen source.

BACKGROUND OF THE INVENTION

Since the discovery of nitrogen fertilizers, they have been advantageously used to increase crop yields. For example, it is well known that because of its high concentration of nitrate ions, ammonium nitrate has important uses in the field of agriculture in general and fertilization in particular. However, despite its agricultural benefits, ammonium nitrate is a highly volatile and unstable material with explosive hazard characteristics.

There are a number of negative environmental consequences of excessive use of nitrogen fertilizers. Indeed, only a part of the applied nitrogen is absorbed by the plants and the wasted nitrogen cause considerable known impacts on the environment as, for example, the increase of the level of nitrates that are leached into groundwater and can therefore pollute waterways. The use of high amounts of nitrogen fertilizer can also increase the level of denitrification leading to higher levels of nitrous oxide emissions (a potent greenhouse gas). A reduction in nitrogen fertilizer application would lessen the environmental damage resulting from extensive nitrogenous fertilizer use.

There are several approaches that have been taken to minimize the adverse effects of the chemical fertilizer use while preserving beneficial effects on plant growth. For example, it has been shown that many microorganisms living in the area near the roots are known to have beneficial effects on plant growth and crop productivity. Indeed, the microflora surrounding plants is very dense and includes, amongst other, bacteria, fungi, yeast and algae. Recent advances in soil microbiology and plant biotechnology have resulted in an increased interest in the use of microbial agents in agriculture, horticulture, forestry and environmental management. In particular, a number of microorganisms known to be present in soil have received considerable attention with respect to their ability to promote plant growth. Moreover, it has been demonstrated in the FR patent no. 2,904,310 that the use of inactive yeast, yeast cell walls, yeast extract or yeast derivatives significantly improves biomass production of non-leguminous crops. It appears that these inactive yeasts might stimulate some microflora populations of soil and improve or accelerate the phases of fragmentation, ammonification and nitrification of organic nitrogen into mineral azote improving nitrogen supply by the soil. The inactive yeasts might also act by hormonal or enzymatical pathways on plant growth. The use of yeasts as soil fertilizers or crop protection products is not still widespread.

Thus, there remains a need for new method and composition for improving plant growth responses and development while reducing nitrogen input.

SUMMARY OF THE DISCLOSURE

The present disclosure relates to a method for improving or enhancing plant growth or plant development comprising delivering to a plant, roots of a plant, soil or substrate, or seeds of a plant a combination of inactive yeast and/or yeast derivatives with a nitrogen source.

In a first aspect, the present disclosure concerns a method for improving plant growth comprising delivering to a plant, roots of a plant, soil or substrate, or seeds of a plant simultaneously, sequentially or separately from each other, inactive yeast and/or yeast derivatives and at least one nitrogen source in a synergistically effective amount. In an embodiment, the at least one nitrogen source excludes ammonium nitrate. In still another embodiment, the present disclosure concerns a method for improving plant growth comprising delivering to a plant, roots of a plant, soil or substrate, or seeds of a plant simultaneously, sequentially or separately from each other, inactive yeast and/or yeast derivatives and at least one nitrogen source in a synergistically effective amount with the proviso that the at least one nitrogen source excludes ammonium nitrate. In an embodiment, the at least one nitrogen source is an organic nitrogen source, an inorganic nitrogen source, or a mixture thereof. In still another embodiment, the at least one organic nitrogen source is a urea-containing compound. In yet another embodiment, the at least one organic nitrogen source is urea. In a further embodiment, the at least one organic nitrogen source is urea 46% nitrogen. In still another embodiment, the at least one inorganic nitrogen source is a nitrate-containing or an ammonium-containing compound. In an embodiment, the at least one inorganic nitrogen source is liquid urea ammonium nitrate, ammonium anhydrous, calcium nitrate, potassium nitrate, ammonium sulfate, ammonium thiosulphate, ammonium phosphate, liquid ammonium polyphosphate, or mixtures thereof. In a further embodiment, the at least one inorganic nitrogen source is calcium nitrate or ammonium sulfate. In still another embodiment, the yeast is from the genus *Saccharomyces* sp. In a further embodiment, the yeast is *Saccharomyces cerevisiae* or *S. cerevisiae* var. *boulardii*. In yet another embodiment, the yeast is *S. cerevisiae*. In another embodiment, the inactive yeast and/or yeast derivatives are produced via a thermal, a mechanical, a chemical or an enzymatic treatment. In still another embodiment, the inactive yeast and/or yeast derivatives are produced via a thermal treatment. In yet another embodiment, the inactive yeast and/or yeast derivatives and the at least one nitrogen source are delivered simultaneously. In an embodiment, the inactive yeast and/or yeast derivatives is delivered directly to a plant, roots of a plant, soil or substrate or seeds of a plant in an amount of at least 0.5 kg to 50 kg of dry matter per hectare, 1 kg to 10 kg of dry matter per hectare or 1 kg to 5 kg of dry matter per hectare. In another embodiment, the percentage of the inactive yeast and/or yeast derivatives is between about 0.5% and 50%; 0.5% to 45%; 0.5% to 40%; 0.5% to 35%; 0.5% to 30%; 0.5% to 25%; 0.5% to 20%; 0.5% to 15%; 0.5% to 10%; or 0.5% to 5% by weight relative to the total weight of the inactive yeast and/or yeast derivatives and the at least one nitrogen source. In still another embodiment, the plant growth is an increase in the dry weight of aerial parts and/or roots of a plant; and/or the average length of aerial parts and/or roots of a plant; and/or the average number of aerial parts and/or roots produced by a plant and/or in the total plant biomass compared to controls treated with the inactive yeast and/or yeast derivatives alone or the at least one nitrogen source alone. In an embodiment, the plant growth is increased by at least 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45% or 50% compared to controls treated with the inactive yeast and/or yeast derivatives alone or the at least one nitrogen source alone.

According to a second aspect, the present disclosure provides a composition for improving plant growth comprising inactive yeast and/or yeast derivatives and at least one nitrogen source in a synergistically effective amount. In an embodiment, the at least one nitrogen source excludes ammonium nitrate. In an embodiment, the at least one nitrogen source is an organic nitrogen source, an inorganic nitrogen source, or a mixture thereof. In still another embodiment, the at least one organic nitrogen source is a urea-containing compound. In still another embodiment, the present disclosure provides a composition for improving plant growth comprising inactive yeast and/or yeast derivatives and at least one nitrogen source in a synergistically effective amount with the proviso that the at least one nitrogen source excludes ammonium nitrate. In yet another embodiment, the at least one organic nitrogen source is urea. In a further embodiment, the at least one organic nitrogen source is urea 46% nitrogen. In still another embodiment, the at least one inorganic nitrogen source is a nitrate-containing or an ammonium-containing compound. In an embodiment, the at least one inorganic nitrogen source is liquid urea ammonium nitrate, ammonium anhydrous, calcium nitrate, potassium nitrate, ammonium sulfate, ammonium thiosulphate, ammonium phosphate, liquid ammonium polyphosphate, or mixtures thereof. In a further embodiment, the at least one inorganic source is calcium nitrate or ammonium sulfate. In still another embodiment, the yeast is from the genus *Saccharomyces* sp. In a further embodiment, the yeast is *S. cerevisiae* or *S. cerevisiae* var. *boulardii*. In yet another embodiment, the yeast is *S. cerevisiae*. In another embodiment, the inactive yeast and/or yeast derivatives are produced via a thermal, a mechanical, a chemical or an enzymatic treatment. In still another embodiment, the inactive yeast and/or yeast derivatives are produced via a thermal treatment. In an embodiment, the percentage of the inactive yeast and/or yeast derivatives is between about 0.5% and 50%; 0.5% to 45%; 0.5% to 40%; 0.5% to 35%; 0.5% to 30%; 0.5% to 25%; 0.5% to 20%; 0.5% to 15%; 0.5% to 10%; or 0.5% to 5% by weight relative to the total weight of the inactive yeast and/or yeast derivatives and the at least one nitrogen source. In still another embodiment, the composition further comprises a biological insecticide, a chemical insecticide, a fungicide, a nematicide, a bacteriocide, an herbicide, a plant extract, a plant growth regulator, a fertilizer or a mineral solution.

DETAILED DESCRIPTION

Unexpectedly, it has been discovered that the combination of inactive yeast and/or yeast derivatives with at least one nitrogen source has a synergetic effect and leads to an increased or enhanced plant growth and/or improved the production of biomass crops. More particularly, the combination of inactive yeast and/or yeast derivatives with at least one nitrogen source produces, when the combination is delivered or applied to a plant, roots of a plant, soil or substrate, or seeds of a plant a highly significant effect on plant growth.

To this end, the present disclosure provides a method for improving plant growth by delivering to a plant, roots of a plant, soil or substrate or seeds of a plant simultaneously, sequentially or separately from each other, inactive yeast and/or yeast derivatives and at least one nitrogen source. Delivery of the combination of inactive yeast and/or yeast derivatives and at least one nitrogen source to a plant, roots of a plant, soil or substrate or seeds of a plant benefits the plant growth, plant development and/or plant health.

The present disclosure also provides a combination of components for improving plant growth or plant development comprising inactive yeast and/or yeast derivatives and at least one nitrogen source wherein said inactive yeast and/or yeast derivatives or at least one nitrogen source are present in a form that can be delivered simultaneously, sequentially or separately from each other to a plant, roots of a plant, soil or substrate or seeds of a plant. By the term "combination" as used herein, the term means two or more substances in proximity to one another and/or used together. The composition of inactive yeast and/or yeast derivatives and the at least one nitrogen source may be considered a combination.

In another embodiment, the present disclosure provides a composition for improving plant growth comprising inactive yeast and/or yeast derivatives and at least one nitrogen source.

The bio-stimulant combination of inactive yeast and/or yeast derivatives with at least one nitrogen source as described herein can be used, as previously mentioned, not only to improve plant growth but also to achieve more efficient nutrient utilization.

As used herein, the term "to improve plant growth" is intended to refer to increase, enhance or stimulate plant growth or plant development, improve plant yield (e.g., increase biomass, increase fruit number, or a combination thereof), increase root number, increase root mass, increase root volume, increase leaf area, increase plant stand, increase plant vigor, increase crop production, increases in dry weight of the roots and/or shoots, increase total plant biomass or combinations thereof. By "improve", "increase" or "enhance" in relation with plant growth, it is meant that the plant growth is generally improved for one or more properties or parameters as compared to an untreated control.

As used herein, the term "delivering simultaneously" means that the inactive yeast and/or yeast derivatives and the nitrogen source are delivered to a plant, roots of a plant, soil or substrate or seeds of a plant at the same time or substantially at the same time via the same mode of application.

As used herein, the term "delivering separately" means that the inactive yeast and/or yeast derivatives and the nitrogen source are delivered to a plant, roots of a plant, soil or substrate or seeds of a plant at the same time or substantially at the same time via a different mode of application.

As used herein, the term "delivering sequentially" means that the inactive yeast and/or yeast derivatives and the nitrogen source are delivered to a plant, roots of a plant, soil or substrate or seeds of a plant at different times, the mode of application being identical or different.

The term "inactive yeast and/or yeast derivatives" when used herein will be understood to refer to both inactive yeast and yeast derivatives, including yeast extracts, yeast hulls and/or yeast cell walls. The yeasts used are inactivated, killed or lysed by any of various means as, for example, thermal, mechanical, chemical or enzymatic treatment. Methods to inactivate yeasts are well known techniques to those skilled in the art.

In the context of the present disclosure, yeasts useful for the embodiments described herein include but are not limited to *Saccharomyces*. Suitable yeasts can be from the genus *Candida, Torula, Hanseniaspora, Hansenula, Kluyveromyces, Metschnikowia, Pichia, Starmerella* and *Torulaspora* or mixture thereof. In an embodiment, the at least one *Saccharomyces* species is *S. cerevisiae* or *S.*

*cerevisiae* var. *boulardii*. In another embodiment, the at least one *Candida* species is *C. utilis*. In a further embodiment, the "yeast" is a blend of two or more different yeast genus and/or species. In another embodiment, the "yeast" is a blend of at least one strain of *S. cerevisiae* and at least one different yeast genus and/or species. In yet another embodiment, the "yeast" is a blend of two or more strains of *S. cerevisiae* or *S. cerevisiae* var. *boulardii*

The nitrogen sources or nitrogenous components that can be used in conjunction with the inactive yeast and/or yeast derivatives may be from any form with the proviso that the nitrogen sources exclude ammonium nitrate. Nitrogen sources may include organic nitrogen sources, inorganic nitrogen sources, or a mixture thereof. Suitable organic nitrogen source may include, but is not limited to, urea. "Inorganic nitrogen sources" are mineral-based and/or ionic compounds containing, for example, nitrate ions and/or ammonia ions, both of which provide nitrogen in a form available for uptake by plants or for conversion into an uptake which is in a compatible form by soil microorganisms. In an embodiment, the nitrogen source is a nitrate-containing, a urea-containing, an ammonium-containing compound, or mixtures thereof. In a further embodiment, the nitrogen source can be, for example, urea (as, for example, urea 46% nitrogen), liquid urea ammonium nitrate, ammonium anhydrous, calcium nitrate, potassium nitrate, ammonium sulfate, ammonium thiosulphate, ammonium phosphate, liquid ammonium polyphosphate, related compounds or any combinations thereof.

In an embodiment, the combination of inactive yeast and/or yeast derivatives with at least one nitrogen source of the present disclosure may be applied to any types of plants. Examples of plants include, but are not limited to, cereals (such as wheat, barley, oat, rye, triticale), maize, rice, leguminous plants (such as alfalfa, clover, sainfoin), forage crop (such as ryegrass, fescues, cocksfoot, festulolium, vetch, forage turnips, forage radishes), oil- and protein-rich plants (such as soybeans, colza, peas, fava beans, white lupin, sunflower), vegetable crops, fruit trees, viticulture and ornamental crops (such as flower production, turfgrass, nurseries).

Inactive yeast and/or yeast derivatives and the at least one nitrogen source of the present disclosure may be applied or delivered directly to plants, plants parts (such as foliage and roots) or seeds, or alternatively may be applied or mixed directly to soil or substrate in which the plants are growing or to be grown or in which the seeds have been or are to be sown. In an embodiment, inactive yeast and/or yeast derivatives and the at least one nitrogen source are delivered to a plant (foliar parts), roots of a plant, soil or substrate or seeds of a plant. The application may be performed by any suitable means as, for example, spreading, spraying, pouring a plant (foliar parts), roots of a plant, soil or substrate or seedlings or by soaking of seeds before planting, and/or drenching of seeds after planting. Multiple means of application may be used in combination. Soil, substrate, seeds, seedlings or plants at any stages may be treated as many times as necessary and the number of applications may be determined depending on, for example, the fertilization program, the plant species, the stage of development at which treatment is initiated, the state of health, the growth, environmental and/or climatic conditions and the purpose for which the plant is grown. In an embodiment, the inactive yeast and/or yeast derivatives and the nitrogen source are delivered to a plant, roots of a plant, soil or substrate or seeds of a plant at the same time or substantially at the same time via the same mode of application.

Additional components may be incorporated with inactive yeast and/or yeast derivatives and the at least one nitrogen source of the present disclosure, such as, but not limited to, biological, or a chemical insecticide, fungicide, nematicide, bacteriocide, herbicide, plant extract, plant growth regulator, fertilizer or mineral solution.

The components and/or the composition of the present disclosure can be formulated and applied in dry (as, for example, granules, microgranules, powders, pellets, sticks, flakes, crystals, and crumbles) or liquid form. The components and/or the composition of the present disclosure can also be applied or coated onto the surface of a seed of a plant in combination with any known agriculturally acceptable carrier according to any suitable methods known in the art.

The concentrations of each component, i.e. inactive yeast and/or yeast derivatives and the at least one nitrogen source, to apply or deliver directly to a plant, roots of a plant, soil or substrate or seeds of a plant depend on a variety of factors including, but not limited to, the identity (genus, species) and number of yeast strains employed, the plant species being treated, the nature and condition of the soil to be treated, the form in which the inactive yeast and/or yeast derivatives and nitrogen source is applied, the means by which it is applied, and the stage of plant growth. The concentrations of each component, i.e. inactive yeast and/or yeast derivatives and the at least one nitrogen source are in a synergistically effective amount. A "synergistically effective amount" as used herein refers to represent a quantity of a combination of inactive yeast and/or yeast derivatives and at last one nitrogen source that is statistically significantly more effective against plant growth than the inactive yeast and/or yeast derivatives or the nitrogen source only. For any given case, appropriate concentrations may be determined using only routine experimentation. The amount of inactive yeast and/or yeast derivatives in combination with a nitrogen source can range up to an amount that would be effective for its intended purpose but not such an amount that would damage the plant or other vegetation or seeds being treated. In an embodiment, inactive yeast and/or yeast derivatives are applied or delivered directly to a plant, roots of a plant, soil or substrate or seeds of a plant in an amount of at least 0.1 kg to 50 kg; 0.1 kg to 45 kg; 0.1 kg to 40 kg; 0.1 kg to 35 kg; 0.1 kg to 30 kg; 0.1 to 25 kg; 0.1 kg to 20 kg; 0.1 kg to 15 kg; 0.1 kg to 10 kg; or 0.1 kg to 5 kg of dry matter per hectare (and by application). In yet another embodiment, inactive yeast and/or yeast derivatives are applied or delivered directly to a plant, roots of a plant, soil or substrate or seeds of a plant in an amount of at least 0.5 kg to 25 kg; 0.5 kg to 20 kg; 0.5 kg to 15 kg; 0.5 kg to 10 kg; or 0.5 to 5 kg of dry matter per hectare (and by application). In still another embodiment, inactive yeast and/or yeast derivatives are applied or delivered directly to a plant, roots of a plant, soil or substrate or seeds of a plant in an amount of at least 1 kg, 2 kg, 3 kg, 4 kg, 5 kg, 6 kg, 7 kg, 8 kg, 9 kg, 10 kg, 11 kg, 12 kg, 13 kg, 14 kg, 15 kg, 16 kg, 17 kg, 18 kg, 19 kg, 19 kg, 20 kg, 21 kg, 22 kg, 23 kg, 24 kg or 25 kg of dry matter per hectare (and by application). In an embodiment, the percentage of inactive yeast and/or yeast derivatives concentration in the total combination and/or composition (and/or nitrogen fertilizer and or the nitrogen source) is between 0.5% and 50%; 0.5% to 45%; 0.5% to 40%; 0.5% to 35%; 0.5% to 30%; 0.5% to 25%; 0.5% to 20%; 0.5% to 15%; 0.5% to 10%; or 0.5% to 5% by weight relative to the total weight of the inactive yeast and/or yeast derivatives and the at least one nitrogen source. The nitrogen source/nitrogen fertilizer is applied according to crop-specific recommendations which will depend upon the application method, time of application, rate of application, and product formulation. Methods to calculate the fertilizer application rate is well known to those skilled in the art.

The growth of plants that have been treated by the method of the present disclosure is increased, by at least, 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45% or 50% as compared to plants that have been treated with the inactive yeast and/or yeast derivatives or the at least one nitrogen source only (controls).

The following examples serve to further describe and define the invention, and are not intended to limit the invention in any way.

EXAMPLES

Example 1

Effect of inactive yeast and/or yeast derivatives in combination with nitrogenous components on plant growth The ability of inactive yeast and/or yeast derivatives in combination with a nitrogen source or nitrogenous components to promote total plant growth was evaluated. The study was realized with *Saccharomyces cerevisiae* (Bioréveil®, Lallemand) which has been inactivated via a thermal treatment. Seeds of triticale (var. Bellac) coated with insecticide Gaucho 350 and fungicide Rédigo® (Bayer) were used in the study. The tested nitrogenous components were the following: urea and calcium nitrate. The inactive yeast and/or yeast derivatives were tested at two different concentrations, 5 and 50 kg/ha.

Treatments and experimental design:

Two seeds were grown in individual plastic pots or cells containing equal quantity of soil (20 g). The treatments T1 to T4, T6, T7, T9, T10 and T13 (see Table 1) were distributed randomly in lines, with each line comprising of all treatments. Treatments T1 to T4, T6, T7, T9, T10 and T13 were repeated seven times and the experiment was repeated twice over time.

TABLE 1

| Treatments | |
|---|---|
| Treatment numbers | Treatments |
| T1 | *Saccharomyces cerevisiae* 5 kg/ha |
| T2 | *Saccharomyces cerevisiae* 50 kg/ha |
| T3 | Urea |
| T4 | Calcium nitrate |
| T5 | Ammonium sulfate |
| T6 | *Saccharomyces cerevisiae* 5 kg/ha + urea |
| T7 | *Saccharomyces cerevisiae* 5 kg/ha + calcium nitrate |
| T8 | *Saccharomyces cerevisiae* 5 kg/ha + ammonium sulfate |
| T9 | *Saccharomyces cerevisiae* 50 kg/ha + urea |
| T10 | *Saccharomyces cerevisiae* 50 kg/ha + calcium nitrate |
| T11 | *Saccharomyces cerevisiae* 50 kg/ha + ammonium sulfate |
| T12 | *Saccharomyces cerevisiae* 5 kg/ha + calcium sulfate (control) |
| T13 | Control with water |

The doses of inoculation of inactive yeast and/or yeast derivatives are given in Table 2.

TABLE 2

| Inactive yeast and/or yeast derivatives (in the form of dry matter) dose of inoculation: | | |
|---|---|---|
| Dose (kg/ha) | Surface coefficient ($m^2$) | Dose per cell ($g/m^2$) |
| 5 kg/ha | 1.76E−07 | 8.82E−04 |
| 50 kg/ha | 1.76E−07 | 8.82E−03 |

The concentrations of the nitrogen sources are given in Table 3.

TABLE 3

| Nitrogen sources and concentrations: | | | | |
|---|---|---|---|---|
| Nitrogen source (nitrogen content) | Nitrogen dose (kg/ha) | Fertilizer dose (g/ha) | Surface coefficient ($m^2$) | Dose per cell ($g/m^2$) |
| Urea (46%) | 15 | 32608.70 | 1.76E−07 | 5.75E−03 |
| Calcium nitrate (15.5%) | 15 | 96774.19 | 1.76E−07 | 1.71E−02 |
| Ammonium sulfate (21%) | 15 | 71428.57 | 1.76E−07 | 1.26E−02 |
| Calcium sulfate (0%) | — | 82551.02 | 1.76E−07 | 1.46E−02 |

The treatments T1 to T4, T6, T7, T9, T10 and T13 were applied, in a liquid form, directly in the soil surrounding the seeds. The treatments were mixed with sterile distilled water in a total 5 ml samples. For the negative control, 5 ml of sterile distilled water was added. Seeds were grown under controlled conditions for 30 days. Growth conditions were 18/15 C for 10/14 hours (day/night) and 70% RH. Growth measurements were taken by measuring length and dry weight of the aerial part of the plants.

Results:

The growth in weight of the plants (the dry weight of the aerial parts) for each treatment was compared by statistical analysis. The results are reported in Tables 4 and 5.

TABLE 4

| Effect of inactive yeast and/or yeast derivatives in combination with calcium nitrate on plant growth | |
|---|---|
| Treatment | Dry weight gain average |
| T1 *Saccharomyces cerevisiae* 5 kg/ha | 0.080b |
| T2 *Saccharomyces cerevisiae* 50 kg/ha | 0.098b |
| T4 Calcium nitrate | 0.106b |
| T7 *Saccharomyces cerevisiae* 5 kg/ha + calcium nitrate | 0.165a |
| T10 *Saccharomyces cerevisiae* 50 kg/ha + calcium nitrate | 0.174a |
| T13 Control with water | 0.080b |

Numbers with a different letter beside them are statistically significantly different from each other ($p<0,1$ Dunnett bilateral test).

TABLE 5

| Effect of inactive yeast and/or yeast derivatives in combination with urea on plant growth | |
|---|---|
| Treatment | Dry weight gain average |
| T1 *Saccharomyces cerevisiae* 5 kg/ha | 0.115c |
| T2 *Saccharomyces cerevisiae* 50 kg/ha | 0.130c |

TABLE 5-continued

Effect of inactive yeast and/or yeast derivatives
in combination with urea on plant growth

| Treatment | Dry weight gain average |
|---|---|
| T3 Urea | 0.153bc |
| T6 Saccharomyces cerevisiae 5 kg/ha + urea | 0.181a |
| T9 Saccharomyces cerevisiae 50 kg/ha + urea | 0.163ab |
| T13 Control with water | 0.098c |

Numbers with a different letter beside them are statistically significantly different from each other (p<0,1 Dunnett bilateral test).

The results clearly demonstrated that the treatment comprising inactive *S. cerevisiae* and/or yeast derivatives at a dose of 5 kg/ha in combination with calcium nitrate or in combination with urea caused a statistically significant greater growth of the aerial parts of the plantlets than the nitrogen source alone or the inactive yeast and/or yeast derivatives alone. The results also demonstrated that there was no statistical difference between the treatment comprising inactive *S. cerevisiae* and/or yeast derivatives at a dose of 5 kg/ha in combination with a nitrogen source (calcium nitrate or urea) and the treatment comprising inactive *S. cerevisiae* and/or yeast derivatives at a dose of 50 kg/ha in combination with a nitrogen source.

Following are particular embodiments of the disclosed invention.

E1. A method for improving plant growth comprising delivering to a plant, roots of a plant, soil or substrate, or seeds of a plant simultaneously, sequentially or separately from each other, inactive yeast and/or yeast derivatives and a nitrogen source.

E2. The method of E1, wherein the nitrogen source is a nitrate-containing, an urea-containing, an ammonium-containing compound, or mixtures thereof.

E3. The method of E2, wherein the nitrogen source is urea, urea ammonium nitrate, ammonium anhydre, ammonium nitrate, calcium ammonium nitrate, calcium nitrate, potassium nitrate, ammonium sulfate, ammonium thiosulphate, ammonium sulphate nitrate, ammonium bicarbonate, ammonium phosphate, monoammonium phosphate, diammonium phosphate, nitrophosphate, liquid ammonium polyphosphates, or mixtures thereof.

E4. The method of any one of E1 to E3, wherein the yeast is of the genus of *Saccharomyces, Candida, Torula, Hanseniaspora, Hansenula, Kluyveromyces, Metschnikowia, Pichia, Starmerella, Torulaspora* or mixtures thereof.

E5. The method of E4, wherein the yeast is *Saccharomyces cerevisiae*.

E6. The method of any one of E1 to E5, wherein the inactive yeast and/or yeast derivatives and the nitrogen source are delivered simultaneously.

E7. The method of any one of E1 to E6, wherein the inactive yeast and/or yeast derivatives is delivered directly to a plant, roots of a plant, soil or substrate or seeds of a plant in an amount of at least 0.5 kg to 50 kg of dry matter per hectare, 1 kg to 10 kg of dry matter per hectare or 1 kg to 5 kg of dry matter per hectare.

E8. A combination of components for improving plant growth comprising inactive yeast and/or yeast derivatives and a nitrogen source, wherein said inactive yeast and/or yeast derivatives or nitrogen source are present in a form that can be delivered to a plant, roots of a plant, soil or substrate, or seeds of a plant simultaneously, sequentially or separately from each other.

E9. The combination of components of E8, wherein the nitrogen source is a nitrate-containing, an urea-containing, an ammonium-containing compound, or mixtures thereof.

E10. The combination of components of E9, wherein the nitrogen source is urea, urea ammonium nitrate, ammonium anhydre, ammonium nitrate, calcium ammonium nitrate, calcium nitrate, potassium nitrate, ammonium sulfate, ammonium thiosulphate, ammonium sulphate nitrate, ammonium bicarbonate, ammonium phosphate, monoammonium phosphate, diammonium phosphate, nitrophosphate, liquid ammonium polyphosphates, or mixtures thereof.

E11. The combination of components of any one of E8 to E10, wherein the yeast is of the genus of *Saccharomyces, Candida, Torula, Hanseniaspora, Hansenula, Kluyveromyces, Metschnikowia, Pichia, Starmerella, Torulaspora* or mixtures thereof.

E12. The combination of components of E11, wherein the yeast is *Saccharomyces cerevisiae*.

E13. The combination of components of any one of E8 to E12, wherein the inactive yeast and/or yeast derivatives is delivered directly to a plant, roots of a plant, soil or substrate or seeds of a plant in an amount of at least 0.5 kg to 50 kg of dry matter per hectare, 1 kg to 10 kg of dry matter per hectare or 1 kg to 5 kg of dry matter per hectare.

E14. A composition for improving plant growth comprising inactive yeast and/or yeast derivatives and a nitrogen source.

E15. The composition of E14, wherein the nitrogen source is a nitrate-containing, an urea-containing, an ammonium-containing compound, or mixtures thereof.

E16. The composition of E15, wherein the nitrogen source is urea, urea ammonium nitrate, ammonium anhydre, ammonium nitrate, calcium ammonium nitrate, calcium nitrate, potassium nitrate, ammonium sulfate, ammonium thiosulphate, ammonium sulphate nitrate, ammonium bicarbonate, ammonium phosphate, monoammonium phosphate, diammonium phosphate, nitrophosphate, liquid ammonium polyphosphates, or mixtures thereof.

E17. The composition of any one of E14 to E16, wherein the yeast is of the genus of *Saccharomyces, Candida, Torula, Hanseniaspora, Hansenula, Kluyveromyces, Metschnikowia, Pichia, Starmerella, Torulaspora* or mixtures thereof.

E18. The composition of E17, wherein the yeast is *Saccharomyces cerevisiae*.

E19. The composition of any one of E14 to E18, wherein the inactive yeast and/or yeast derivatives concentration in a nitrogen fertilizer is between 0.5 and 30% by weight of the total weight of the fertilizer.

E20. The composition of any one of E14 to E19, wherein the composition further comprises any one of a biological, or a chemical insecticide, fungicide, nematicide, bacteriocide, herbicide, plant extract, plant growth regulator, fertilizer or mineral solution.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and as may be applied to the essential features hereinbefore set forth, and as follows in the scope of the appended claims.

What is claimed is:

1. A method for improving plant growth consisting of delivering to a plant, roots of a plant, soil or substrate, or seeds of a plant simultaneously, sequentially or separately from each other, a combination of inactive yeast and/or yeast derivatives with an at least one nitrogen source, with the proviso that at least one nitrogen source excludes ammonium nitrate, wherein said combination of inactive yeast and/or yeast derivatives and said at least one nitrogen source causes a greater plant growth than delivering to the plant, roots of the plant, soil or substrate, or seeds of the plant simultaneously, sequentially or separately from each other, i) the at least one nitrogen source alone or ii) the inactive yeast and/or the yeast derivatives alone.

2. The method of claim 1, wherein the at least one nitrogen source is an organic nitrogen source, an inorganic nitrogen source, or a mixture thereof.

3. The method of claim 2, wherein the inorganic nitrogen source is an ammonium-containing compound.

4. The method of claim 2, wherein the inorganic nitrogen source is liquid urea ammonium nitrate, ammonium anhydrous, calcium nitrate, potassium nitrate, ammonium sulfate, ammonium thiosulphate, ammonium phosphate, liquid ammonium polyphosphate, or mixtures thereof.

5. The method of claim 1, wherein the at least one organic nitrogen source is a urea-containing compound.

6. The method of claim 1, wherein the at least one organic nitrogen source is urea.

7. The method of claim 1, wherein the inorganic nitrogen source is a nitrate-containing compound.

8. The method of claim 1, wherein the inorganic nitrogen source is calcium nitrate.

9. The method of claim 1, wherein the yeast is *Saccharomyces cerevisiae* or *S. cerevisiae* var. *boulardii*.

10. The method of claim 1, wherein the inactive yeast and/or yeast derivatives and the at least one nitrogen source are delivered simultaneously.

11. The method of claim 1, wherein the inactive yeast and/or yeast derivatives is delivered directly to a plant, roots of a plant, soil or substrate or seeds of a plant in an amount of at least 0.5 kg to 50 kg of dry matter per hectare.

12. The method of claim 1, wherein the percentage of the inactive yeast and/or yeast derivatives is between about 0.5% and 50% by weight relative to the total weight of the inactive yeast and/or yeast derivatives and the at least one nitrogen source.

13. The method of claim 1, wherein the plant growth is an increase in the dry weight of aerial parts and/or roots of a plant; and/or the average length of aerial parts and/or roots of a plant; and/or the average number of aerial parts and/or roots produced by a plant and/or in the total plant biomass compared to controls treated with the inactive yeast and/or yeast derivatives alone or the at least one nitrogen source alone.

14. The method of claim 1, wherein the plant growth is increased by at least 1% compared to controls treated with the inactive yeast and/or yeast derivatives alone or the at least one nitrogen source alone.

15. The method of claim 1, wherein the inactive yeast and/or yeast derivatives is delivered directly to a plant, roots of a plant, soil or substrate or seeds of a plant in an amount of 1 kg to 10 kg of dry matter per hectare.

16. The method of claim 1, wherein the inactive yeast and/or yeast derivatives is delivered directly to a plant, roots of a plant, soil or substrate or seeds of a plant in an amount of 1 kg to 5 kg of dry matter per hectare.

17. The method of claim 1, wherein the percentage of the inactive yeast and/or yeast derivatives is between about 0.5% to 15% by weight relative to the total weight of the inactive yeast and/or yeast derivatives and the at least one nitrogen source.

18. The method of claim 1, wherein the percentage of the inactive yeast and/or yeast derivatives is between about 0.5% to 5% by weight relative to the total weight of the inactive yeast and/or yeast derivatives and the at least one nitrogen source.

19. The method of claim 1, wherein the plant growth is increased by at least 15% compared to controls treated with the inactive yeast and/or yeast derivatives alone or the at least one nitrogen source alone.

20. The method of claim 1, wherein the plant growth is increased by at least 50% compared to controls treated with the inactive yeast and/or yeast derivatives alone or the at least one nitrogen source alone.

* * * * *